United States Patent [19]

Kytta

[11] 4,200,001
[45] Apr. 29, 1980

[54] VALVE TRAVEL MECHANISM

[75] Inventor: Oswald O. Kytta, South Bend, Ind.

[73] Assignee: The Bendix Corporation, Southfield, Mich.

[21] Appl. No.: 971,466

[22] Filed: Dec. 20, 1978

Related U.S. Application Data

[63] Continuation-in-part of Ser. No. 812,548, Jul. 5, 1977, abandoned.

[51] Int. Cl.² ............................ G05G 9/00; F15B 9/10
[52] U.S. Cl. .................................... 74/478; 74/512; 91/369 R; 91/369 B
[58] Field of Search ............. 251/232, 243, 244, 239; 91/369 A, 369 R, 369 B, 376 R; 74/512, 513, 514, 560, 523, 478

[56] References Cited

U.S. PATENT DOCUMENTS

| 2,275,697 | 3/1942 | Stelzer | 91/369 B |
|---|---|---|---|
| 2,395,223 | 2/1946 | Ingres | 74/516 X |
| 2,822,135 | 2/1958 | Winslow | 251/244 X |
| 2,980,068 | 4/1961 | Stelzer | 91/369 B X |
| 3,002,499 | 10/1961 | Schultz | 91/369 B X |
| 3,013,533 | 12/1961 | Brown | 91/369 B |
| 3,013,537 | 12/1961 | Schultz | 91/376 |
| 3,059,434 | 10/1962 | Farmery et al. | 91/369 R |
| 3,150,493 | 9/1964 | Rike | 91/376 X |
| 3,289,547 | 12/1966 | Kytta | 92/48 X |
| 3,838,628 | 10/1974 | Kita | 91/369 B |
| 3,845,692 | 11/1974 | Takeuchi | 91/369 B |
| 3,945,261 | 3/1976 | Wright | 74/516 X |
| 3,981,227 | 9/1976 | Azuma | 91/369 B |
| 4,005,638 | 2/1977 | Takeuchi | 91/369 B |
| 4,070,801 | 1/1978 | O'Neal | 52/83 |

FOREIGN PATENT DOCUMENTS

| 681361 | 3/1964 | Canada | 91/369 A |
|---|---|---|---|
| 1915705 | 10/1970 | Fed. Rep. of Germany | 91/369 B |
| 731023 | 8/1932 | France | 91/369 R |
| 1508336 | 11/1967 | France | 52/63 |

Primary Examiner—Leslie Braun
Attorney, Agent, or Firm—Leo H. McCormick, Jr.; Ken C. Decker

[57] ABSTRACT

A mechanism for multiplying the travel of a valve as compared with the travel of an input push rod member. The mechanism has a housing with a bore therethrough for retaining an accurate segmented lever. The segmented lever, which is pivotally attached to the housing, axially locates an output push rod member in the bore. A plunger attached to the input push rod has an arcuate projection which engages the segmented lever. The plunger moves in response to an operator input force causing the lever to pivot in said housing and move the output push rod at a different rate of travel than the rate of travel of the input push rod.

5 Claims, 4 Drawing Figures

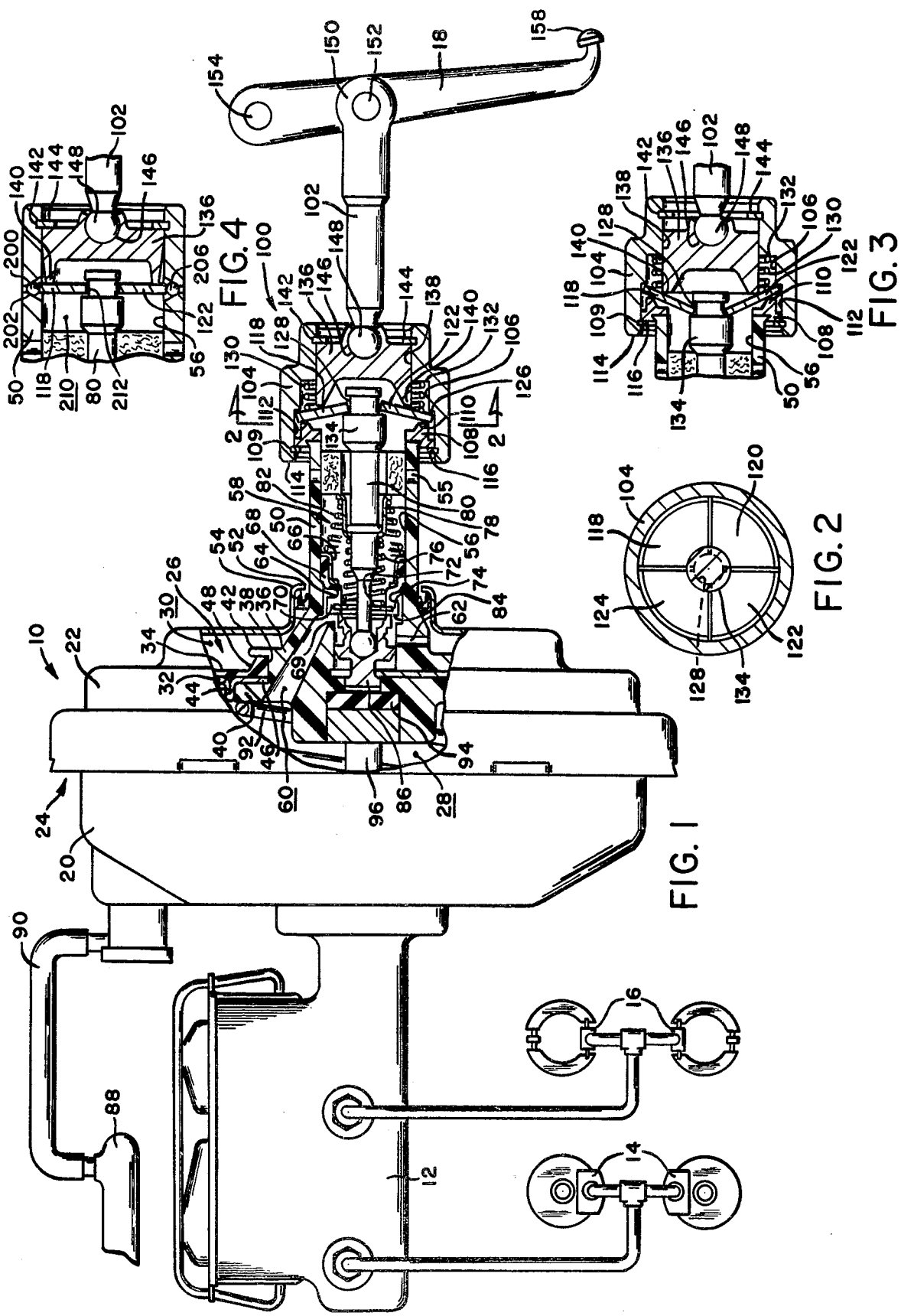

VALVE TRAVEL MECHANISM

This is a continuation-in-part of application Ser. No. 812,548, filed July 5, 1977 now abandoned.

BACKGROUND OF THE INVENTION

Most vehicles currently manufactured in the United States are equipped with servomotor operated braking systems. These servomotors are normally operated through the actuation of a control valve by an operator supplied input force. The control valve is attached to the brake pedal through an input push rod. Arcuate movement of the brake pedal is converted into linear movement and directly transferred into the control valve. Movement of the control valve regulates the communication of an operational fluid supplied to the servomotor in a manner fully disclosed in U.S. Pat. No. 3,289,547. The operational fluid creates a pressure differential across a wall member which acts through an output push rod and supplies a master cylinder with an input force to pressurize the brake fluid in the system and operate the wheel brakes of a vehicle.

It has recently been observed that the time required to actuate the wheel brakes of a vehicle could be reduced if the reaction time required to bring the control valve into operation could be reduced.

SUMMARY OF THE INVENTION

I have devised a mechanism having a lever arrangement for varying the movement of the control valve as compared to the movement of the input push rod and thereby reduce the time required to initiate operation of a servomotor. The mechanism has a housing with a bore therethrough for retaining the lever arrangement. The lever arrangement positions a valve push rod in the center of the bore. The lever arrangement includes a plurality of arcuate arms, a first end of each of the arcuate arms is located in a slot in the output push rod while a second end is pivotally attached to the housing. A plunger which is attached to the input push rod has an arcuate projection on the face thereof for engagement with the arcuate arms. The plunger in response to an operator input force moves the arcuate projection into engagement with the arcuate arms. The arcuate arms pivot about the attached first end and transfer a multiplied input travel into the output member to operate the control valve of the pneumatically operated servomotor.

The factor by which the valve push rod moves as compared to the input push rod is the ratio of the distance between the first and second ends of the arcuate segments of the lever arrangement divided by the distance between the point of engagement of the arcuate projection on the plunger and the second end of the arcuate segment.

It is therefore the object of this invention to provide a servomotor control valve with a lever mechanism for varying the movement of control valve as compared with the input push rod in response to an operator input on the brake pedal.

It is another object of this invention to provide a control valve of a pneumatically operated servomotor with a mechanism for multiplying the input force from a push rod attached to a brake pedal to reduce the time required to effect a brake application.

These and other objects should be apparent from reading this specification and viewing the drawing.

BRIEF DESCRIPTION OF THE INVENTION

FIG. 1 is a sectional view of a mechanism made according to the principles of this invention and to control the operation of a pneumatically powered servomotor in a brake system in a vehicle;

FIG. 2 is a sectional view taken along line 2—2 of FIG. 1;

FIG. 3 is a sectional view of the force transfer mechanism in an applied position; and FIG. 4 is a sectional view of another embodiment of the force transfer mechanism for transmitting an input force to an output member in accordance to the principles of this invention.

DETAILED DESCRIPTION OF THE INVENTION

In the drawing shown in FIG. 1, a servomotor 10 is connected to a master cylinder 12 for providing the front and the rear wheel brakes 14 and 16, respectively, with an operational braking signal in response to an operator input force applied to brake pedal 18.

The servomotor 10 includes a front shell 20 which is connected to a rear shell 22 by a twist lock arrangement 24 to produce a housing. A wall 26, includes a backing plate 32, a diaphragm 34 and a hub 36 which divides the interior of the housing into a front chamber 28 and a rear chamber 30. The hub 36 which extends through the rear shell 22 has a groove 38 located between an annular radial projection 40 and a lip 42. The backing plate 32 has a rib 44 which surrounds the peripheral surface of radial projection 40 to position end 46 adjacent the radial projection 40. A bead 48 on diaphragm 34 which snaps into groove 38 provides a continual resilient force for holding the backing plate 32 against the radial projection 40. The diaphragm 34 also has a bead (not shown) which is located between the front shell by the twist lock connection 24 to assure that an air tight seal exists between the front chamber 28 and the rear chamber 30. The hub 36 also has a first passage 60 which connects the front chamber 28 with the stepped axial bore 56 and a second passage 62 which connects the stepped axial bore 56 with the rear chamber 30. The hub 36 has an annular rearward projection 50 which extends through an opening 52 in the rear shell 22. A seal 54 surrounds projection 50 to prevent air from entering the rear chamber 30 through opening 52. The stepped axial bore 56 which extends through the rearward projection 50 retains a control valve 58 for operating the servomotor 10 in response to an operator input force on brake pedal 18.

The control valve 58 has a flexible poppet member 64 with a first end 68 fixed to the interior of the projection 50 by a retainer 66 and a second end 70 which is free to move within the axial bore 56. A disc 72 located in a groove 74 provides a support for one end of spring 76 while the other end of the spring engages retainer 78 on push rod 80. A return spring 82 located between retainer 78 urges face 84 on plunger 86 against the second end 70 of the flexible poppet member 64 to allow vacuum present in the front chamber 28 to evacuate air from the rear chamber 30 by the flowing through the second passage 62, axial bore 56, and the first passage 60. The pressure level in the front chamber 28 is maintained below atmospheric pressure since a vacuum produced at the manifold 88 of the vehicle evacuates air therefrom through conduit 90. When the fluid pressure in the front and rear chambers 28 and 30 are substantially equal, a return spring 92 located in the front chamber 28 acts on the radial projection 40 of the hub 36 to position wall 26 against the rear shell 22 as shown in FIG. 1.

A reaction disc 94 located in the stepped axial bore 56 transmits an input force into the output push rod 96 which operates the master cylinder 12 in response to an operator braking signal. The operator braking signal is transmitted into the control valve 58 through a mechanism 100 connected to push rod 102.

The mechanism 100 has a housing 104 with a stepped axial bore 106 located therein. An end cap 108 attached to the end of the projection 50 of the hub 36 has an annular projection 110 extending therefrom in a plane parallel to axial bore 56. A first diameter section 112 of the stepped bore 106 is matched to the peripheral surface of cap 108. The housing 104 has a groove 109 in the first diameter section 112 adjacent the end 114. A snap ring 116 located in groove 109 attaches housing 104 to the end cap 108 on projection 50 of the hub 36.

A plurality of arcuate lever arms 118, 120, 122, 124 each have a first end located in the first diameter section 112 of housing 104 between shoulder 126 and the annular projection 110 of the end cap 108 and a second end located in a groove 128 on the end of push rod 80. A spring 130 which is located in a second diameter section of bore 106 has a first end retained by shoulder 132 and a second end which engages the arcuate lever arms 118, 120, 122 and 124. The spring 130 urges the lever arms toward projection 110 on end cap 108 and rib 134 on push rod 80.

A plunger 136 located in a thrid diameter section 138 of stepped bore 106 has a projection 140 which extends into engagement with the plurality of arcuate arms 118, 120, 122 and 124. The housing 104 has a groove 142 in which snap ring 144 is located to prevent plunger 136 from being expelled from bore 106 by return spring 82. The plunger 136 has a spherical socket 146 for retaining ball end 148 of push rod 102. The eye end 150 of push rod 102 pivots on pin 152 as brake pedal 18 rotates on pin 154 in response to an operator input force to the pedal pad 158. In transferring the arcuate motion of the brake pedal arm 18 to linear motion, the push rod 102 rotates about ball 148 as plunger 136 moves in a linear path in bore 106. However the control valve 58 remains in the axial center of bore 56 since the arcuate lever arms 118, 120, 122 and 124 position push rod 80 in the axial center of bore 56.

MODE OF OPERATION OF THE INVENTION

When an internal combustion engine is running, a vacuum is produced at the intake manifold 88. This vacuum is communicated through conduit 90 to the front chamber 28 of the brake actuator servomotor 10. Any air present in the rear chamber 30, flows through the second passage 62 into bore 56, around vacuum seat 69 through the first passage 60 and into the front chamber 28 to the intake manifold 88 to vacuum suspend the wall 26.

When the operator desires to effect a brake application, an input force is applied to brake pedal pad 158. This input force causes the brake pedal 18 to rotate on pin 154 and impart linear movement to push rod 102 for moving plunger 136 in bore 106. The annular projection 140 on plunger 136 engages the arcuate lever arms 118, 120, 122 and 124 causing the same to rotate about the fixed end as illustrated inb FIG. 3 and supply the push rod 80 with a linear multiplied movement to move plunger 86 in bore 56.

Initial movement of plunger 86 allows spring 76 to seat face 70 of the poppet member 64 on vacuum seat 69 and interrupt communication of vacuum between the front and rear chambers 28 and 30.

Further movement of plunger 86 causes face 84 to move away from face 70 and allow air to flow into the rear chamber 30 through the second passage 62 from bore 56 and create a pressure differential across wall 26. This pressure which acts on wall 26 is transmitted into reaction disc 94 through backing plate 32 and hub 36 to provide push rod 96 with a force to operate the master cylinder 12 and provide the front and rear brakes 14 and 16 with an actuation signal to effect braking of the vehicle.

When the input force is removed from the brake pedal 18, return spring 82 moves the plunger 86 into engagement with face 70 to again allow vacuum in the front cvhamber 28 to remove air from the rear chamber 30 and terminates the input force operating the master cylinder.

The input movement from push rod 102 is multiplied as it passes through mechanism 100 by a factor equal to the total length of each of the arcuates lever arms divided by the distance between the point of contact of the projection 140 on plunger 136 and the fixed end of the arcuate lever arms. As an example, if the arcuate projection 140 engages the arcuate lever arms 118, 120, 122 and 124 in the mid point, a multiplication factor of 2 is obtained in the input travel or movement of the control valve 58. Thus, if the brake pedal travel factor is selected at a ratio of 3:1 as is normal for manually operated brake systems, when the power assist from the servomotor is available, a travel increase of 6:1 is achieved by the time the input movement is supplied to the control valve 58 of the servomotor.

In the mechanism illustrated in FIG. 4, the projection 50 of the hub 36 has a series of sockets 200 located along the interior of bore 56. Each of the arcuate lever arms 118, 120, 122 and 124 has a corresponding ball, (only 202 and 206 are shown) located in a socket in the housing 50. The output member or push rod has a series of slots (only 210, 212, are shown) for receiving the free end of the arcuate lever arms 118, 120, 122 and 124 to maintain the same in a radial plane perpendicular to push rod 80 while positioning the push rod 80 in the center of bore 56.

In operation, the input force from push rod 102 moves plunger 140 in bore 56 into engagement with the arcuate lever arms 118, 120, 122 and 124. This input force exerted on the lever arms 118, 120, 122 and 124 causes the lever arms 118, 120, 122 and 124 to pivot on balls 200, 202, 204 and 206 and impart a multiplied input travel to the push rod 80 through the free end in the same manner as the lever arrangement in FIG. 1.

I claim:

1. In a servomotor having a control valve retained in a bore of a hub attached to a movable wall, said control valve being operated through movement of a first plunger by a linear input force directly and continually transmitted from a brake pedal through an input member, said operated control valve allowing a pressure differential to be created across the movable wall and thereafter supply an output member with an operational force, the improvement wherein said input member includes:

a housing having a first end attached to said hub and a second end extending through the servomotor, said housing having a bore therethrough;

a fulcrum member attached to said second end of the housing, said fulcrum member having an annular projection extending rearwardly therefrom;

a cap member having a stepped bore therethrough, said stepped bore having a first diameter section separated from a second diameter section by a first shoulder, said second diameter section surrounding and engaging said fulcrum member;

a first push rod member located in said bore of the housing and connected to said first plunger, said first push rod member having an annular groove located thereon;

lever means having a first end located in said radial groove in said first push rod member and a second end radially extending toward and engaging said second diameter section of said cap member to axially align said first push rod in said bore;

a second plunger located in and slidably engageable with said first diameter of said cap member and said lever means; and a second push rod member connected to said brake pedal and said second plunger, said second push rod member moving said second plunger in said first diameter section of said cap member in response to said linear input force, said lever means responding to movement of said second push rod member by pivoting about said annular projection to supply said first push rod member with an operational movement different than the linear input movement of said second push rod to move said first plunger and bring the control valve into an operational position, said output member remaining substantially stationary until said control valve is in the operational position.

2. The input member as recited in claim 1 further including:
a spring for urging said lever means into constant engagement with said annular projection and said first push rod.

3. The input member as recited in claim 1 wherein said lever means includes:
a series of arcuate segments through which the input force from the second plunger is transmitted into said first push rod.

4. The input member as recited in claim 1 further including:
a fastener connected to the second end of said cap member for preventing movement between said cap and the housing.

5. The input member as recited in claim 1 wherein said lever means includes:
a plurality of arcuate segments, each arcuate segment having a first end located in said groove and a second end with a spherical member attached thereto, each of said spherical members being located in a corresponding socket in said housing.

* * * * *